Figure 1:
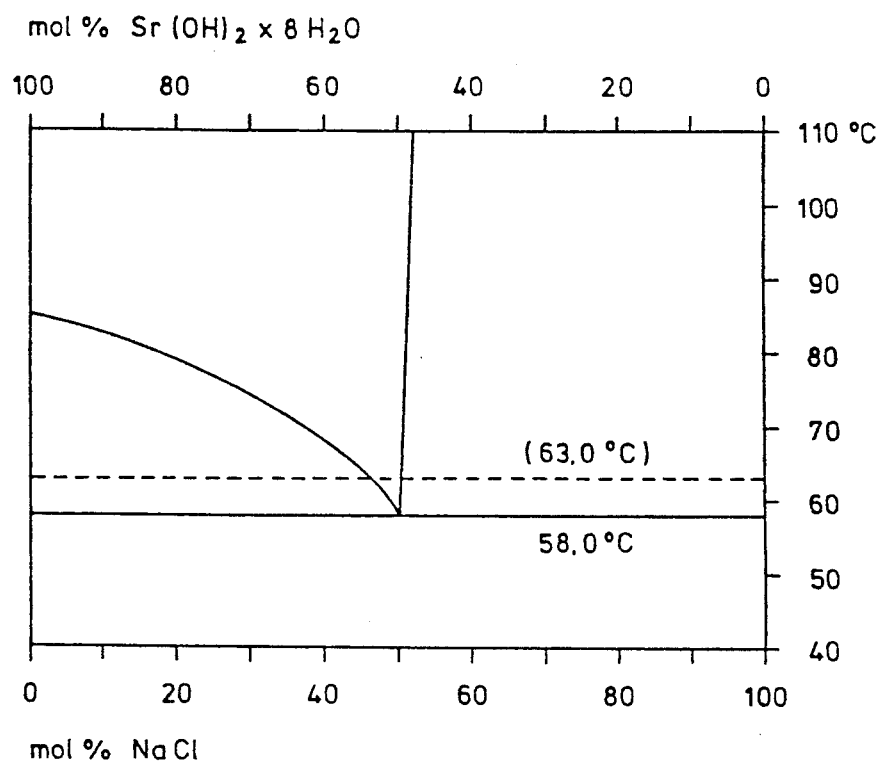

United States Patent [19]

Hormansdorfer

[11] Patent Number: 5,085,790
[45] Date of Patent: Feb. 4, 1992

[54] PHASE CHANGE MATERIALS AND USE THEREOF

[76] Inventor: Gerd Hormansdorfer, Kastanieneck 6A, D-3167 Bergdorf-Beinhorn, Fed. Rep. of Germany

[21] Appl. No.: 534,129

[22] Filed: Jun. 5, 1990

[30] Foreign Application Priority Data

Jun. 6, 1989 [DE] Fed. Rep. of Germany ....... 3918371
Dec. 12, 1989 [DE] Fed. Rep. of Germany ....... 3940985

[51] Int. Cl.$^5$ ................................................. C09K 5/00
[52] U.S. Cl. ........................................ 252/70; 165/10
[58] Field of Search ....................... 252/70; 165/10 A

[56] References Cited

U.S. PATENT DOCUMENTS

| | | | |
|---|---|---|---|
| 3,719,225 | 3/1973 | Mekjean et al. | 252/70 |
| 4,272,392 | 6/1981 | Lane et al. | 252/70 |
| 4,273,666 | 6/1981 | Lane et al. | 252/70 |
| 4,402,846 | 9/1983 | Lane et al. | 252/70 |
| 4,585,573 | 4/1986 | Yanadori et al. | 252/70 |
| 4,637,888 | 1/1987 | Lane et al. | 252/70 |

FOREIGN PATENT DOCUMENTS

| | | |
|---|---|---|
| 2717933 | 10/1978 | Fed. Rep. of Germany . |
| 58-180579 | 10/1983 | Japan . |
| 59-138287 | 8/1984 | Japan . |
| 59-138289 | 8/1984 | Japan . |
| 61-097380 | 5/1986 | Japan . |

OTHER PUBLICATIONS

Tye et al., "Thermophysical Property Measurements on Thermal Energy Storage", 1977, Chem. Abs. Acc. No. 89(26): 222701f.

Primary Examiner—Paul Lieberman
Assistant Examiner—Christine A. Skane
Attorney, Agent, or Firm—Glen R. Grunewald

[57] ABSTRACT

The invention relates to a heat transfer composition comprising at least two members selected from the group consisting of:
a) strontium hydroxide octahydrato;
b) lithium hydroxide monohydrate; and
c) non-hydrate forming chloride or nitrates, wherein for a mixture comprising a) and b) the composition contains from about 40 to about 60 mol % of one hydroxide hydrate relative to the other hydroxide hydrate and for a composition containing c) and a) or b), the composition contains from about 5 to about 40% by weight of c) based on the total weight of hydroxide hydrate. These mixtures have high caloric values and are useful for a variety of applications such as preheaters for car engine cooling water systems.

11 Claims, 2 Drawing Sheets

PHASE CHANGE MATERIALS AND USE THEREOF

The invention concerns heat transfer materials or chase change or latent heat storage materials based on strontium hydroxide octahydrate or lithium hydroxide monohydrate. Furthermore the invention concerns advantageous ranges of use of these phase change materials.

Heat transfer materials are used for heat storage. They are substances with a melting point in the working temperature range of the heat transfer process, so that on heating they change over from solid to liquid, and during cooling they return to solid, thus absorbing and releasing latent heat (heat of fusion, or heat of recrystallization). Their heating curves show a temperature plateau around the melting temperature (and thus in the range of the working temperature of the heat transfer process) in between an initial rise and a subsequent rise after melting is complete. In reverse they remain a corresponding time at the recrystallization temperature during cooling, until all the latent heat is released. As the latent heat generally reaches values about one hundred to two hundred times the specific heat of the same substance, phase change materials in comparison with so-called capacitive heat storage materials (i.e. which do not undergo physical changes around the working temperature) have the advantage, that they can store more energy within a narrow range of temperature for a small volume.

In general phase change materials should possess a melting enthalpy as high as possible, particularly influenced by the volumetric specific melting enthalpy, to obtain maximum storage capacity per volume. Besides this they should be cycle proof, i.e. the phase transition solid-liquid-solid should remain reversibly reproduceable over long periods of time and should not be resistant to chemical reactions, decomposition, separation of crystal water or the like effects. Further important criteria could be solidification behaviour (e.g. formation of a metastable melt, the volume change during phase transition, or the form of crystallization) and the compatibility with construction materials, toxicity and economy. There are known several phase change materials based on e.g. hydroxide hydrates, salt hydrates, low melting metal alloys or even organic compounds, but is has proved difficult to find phase change materials, which meet these criteria satisfactorily in a given situation.

Typical applications are storage for domestic heating (e.g. for solar collectors or heat pumps) or in industrial processes, if waste heat for use elsewhere should be stored, or heat reserves are needed to cover consumption peaks. More special applications are, for example in preheaters for cars, thermal control units in satellites, or heat protection systems for measuring electronics (e.g. in industrial processes) and borehole probes in geophysics. There exists a need to improve phase change materials and to overcome shortcomings of the substances used until now. In particular in order to store as much energy as possible in a given volume, phase change materials are sought which stretch the volume based specific storage capacity to physical limits.

For both organic and inorganic substances, prior studies predict maximal energy densities of the melting enthalpy of up to about 300 J/cm$^3$ in the temperature range up to 130° C. (see: Dr. P. Kesselring, Zur Energiedichte im Latentwärmespeicher-einige grundsätzlich Überlegungen, German VDI-Reports Nr. 288, 1977). My studies indicate that maximal values of the volumetric specific melting enthalpy at the melting temperature can be achieved which approximately correspond to double the numerical value of the melting temperature in degrees Kelvin, so that e.g. a substance having the melting temperature of 85° C. (corresponding to about 358° K.) could reach a melting enthalpy of about 720-730 J/cm$^3$.

Such a value is shown by strontium hydroxide octahydrate, which has been proposed, together with barium hydroxide octahydrate, as a phase change material in the Japanese publication JP-A 76-97584. In the literature there exist different statements concerning the melting point of this substance, which however have proved inaccurate. My studies indicate that the pure substance possesses, at a melting temperature of 85°,5° C., a melting enthalpy of 382 J/g, a specific heat of 1,65 J/g/K. in the solid and of 3,2 J/g/K. in the liquid phase. Using the density of 1,91 g/cm$^3$ which is given in the literature, the volumetric specific melting enthalpy is thus calculated at 730 J/cm$^3$, the specific heat based on the volume with 3,15 J/cm$^3$/K. in the solid and with 6,11 J/cm$^3$/K. in the liquid phase. In the whole temperature range from absolute zero up to about 250° C. no higher volumetric specific values had been found until now.

Lithium hydroxide monohydrate is another known substance having a high melting enthalpy, which has been determined by my own measurements as 465 J/g at a melting temperature of 106°, 8° C. Based on a density of 1,51 g/cm$^3$, which is taken from the literature, the volumetric specific melting enthalpy reaches the high value of 702 J/cm$^3$.

The outstanding caloric values of strontium hydroxide octahydrate and lithium hydroxide monohydrate probably derive not only from the relative sizes of the single atoms and the arrangement within the molecule, but also from the formation of hydrogen bridges with the water molecules present. However, the liquefaction, on heating and the solidification on cooling may not be a melting/solidification in the classical sense, but may be caused by a phase change, involving a release of the water of hydration on heating and a recapture on cooling. But since it is general practice to use the term "melting" even in connection with phase change materials based on hydrates, the same terminology will be used herein for this type of phase change.

Concerning toxicity strontium hydroxide octahydrate is classified as an "irritant" and thus seems to be less toxic than other hydroxides. A TLV-value has not been established. The material safety data sheet recommends not to inhale the dust, to avoid contact with eyes and skin, and to rinse or wash with plenty of water in case of such contact. In view of the proposed application, the classification of the substance is relatively agreeable, since it could possibly replace considerably more toxic substances. However, it was believed to be highly corrosive, like the other hydroxide hydrates, to aluminium, silicon and their alloys, thus requiring appropriate precautions, in order to avoid contact with such metals.

Lithium hydroxide monohydrate is known to be highly corrosive. Thus compatibility with construction materials is limited. Its use as a phase change material might thus be restricted.

Unfortunately there are reasons, which have hindered the use of strontium hydroxide octahydrate or lithium hydroxide monohydrate. Both substances undergo phase separation on melting. The hydroxide when free or low in crystalline water, is nearly insoluble in the separated crystalline water. As the separated phases possess different densities, they have the tendency to demulsify. As a result the phases having higher densities, mainly the hydroxide, sink down, while the lighter phases, which mainly consist of the separated crystalline water, concentrate at the top. This crystalline water cannot be incorporated readily during the recrystallization, so that the release of heat is limited during the reverse reaction. Without additional measures, strontium hydroxide octahydrate, can take up to two days for the complete recombination of the crystalline water, depending on the layer thickness. In practice it was necessary to mechanically remix the phases e.g. by pumping, stirring, shaking or the like, which means additional expenditure and sometimes is not even practical.

It is the object of the invention to make strontium hydroxide octahydrate and lithium hydroxide monohydrate available as heat transfer materials, which melt without significant phase separation, and cover a larger range of melting temperatures.

The invention provides adding to either of these hydroxide hydrates at least one salt from the group of non-hydrateforming chlorides and nitrates, preferably of alkali metals, and/or the other hydroxide hydrate, where the added quantities of the other hydroxide hydrate is in the range of 40–60 mol % of the first hydroxide hydrate, and the added quantities of the salt from 5 to 40 percent of weight, related to the total quantity of hydroxide hydrate.

According to one aspect of the present invention there is provided a heat transfer composition comprising at least two members selected from the group consisting of:
a) strontium hydroxide octahydrate;
b) lithium hydroxide monohydrate; and
c) non-hydrate forming chlorides or nitrates,
wherein for a mixture comprising a) and b) the composition contains from about 40 to about 60 mol % of one hydroxide hydrate relative to the other hydroxide hydrate and for a composition containing c) and a) or b), the composition contains from about 5 to about 40% by weight of c) based on the total weight of hydroxide hydrate.

The non-hydrate forming salts should be readily soluble in water. Potassium and sodium chloride are two preferred salts, preferably in amounts of from about 5 to about 25% by weight. Potassium and sodium nitrates are also preferred, preferably in amounts of from about 20 to about 40% by weight. Where potassium and sodium chlorides are used it is preferred that they comprise from about 40 to about 60 mol % of the total chlorides present. The compositions may also have up to 5% water.

In one embodiment the compositions contain about 55 to about 65 mol % of strontium hydroxide octahydrate and from 45 to about 35 mol % of potassium chloride.

The compositions are useful as heat transfer or thermal storage materials in a wide variety of applications such as in preheaters for automobile engine cooling systems (preferably with the melting point adjusted to from about 60° to about 80° C.), protection of heat-sensitive equipment and in heating devices (such as hot plates) for cooking food.

The invention is based on the surprising finding, that strontium hydroxide octahydrate and lithium hydroxide monohydrate are miscible not only with each other but also with the above salts, and these mixtures melt without significant phase separation or demulsification of the pure substances. As a rule these mixtures have eutectic or invariant melting points, which thus permit the selection of a number of different melting temperatures or melting ranges depending on the mixture. These mixtures also have high melting enthalpies, comparable to those of the pure hydroxide hydrates themselves. Thus a large range of phase change materials is available, covering a broad temperature range at high melting enthalpy, and can be used in a variety of heat storage units.

Further, the mixtures have a fine texture when crystallized in contrast to the coarse-grained texture associated with the crystallized pure substances.

The reason for the advantage of the above mixtures is not understood. Possibly the high solubility in water of the salts permits some kind of absorption of water of crystallization released by the hydroxide hydrates during melting and inhibits or controls phase separation. If the salt is finely distributed within the mixture, preferably in an eutective or quasi eutectic mixture ratio with the strontium hydroxide octahydrate or lithium hydroxide monohydrate, the water of crystallization which separates from the strontium hydroxide octahydrate and/or lithium hydroxide monohydrate should also be finely distributed throughout the mixture, through solution with the salt. If there is sufficient cohesive force and not too large a density difference between the components of the mixture, it may be possible, to prevent phase separation. If in turn the added inorganic salts don't possess a firm cohesive force to water, hence themselves are not able to form hydrates with water, the temperature is lowered, initiating recombination with the water of crystallization, it is likely that this water is willingly released from the added salt.

Although the result is similar, the mixtures behave differently depending on the anion of the salt. Nitrates lead to mixtures, which though having incongruent melting behaviour and permitting separation of water of crystallization, completely recombine this water of crystallization during recrystallization within an acceptable short time. Similar behaviour is shown by mixtures of strontium hydroxide octahydrate and lithium hydroxide monohydrate (where in this case the physical background is relatively open in the moment) and quasi ternary systems of strontium hydroxide octahydrate, lithium hydroxide monohydrate and one of the salts.

Mixtures with chlorides however show a completely different behaviour, which can be plainly described as "dry melting". The above effects seem to take place with chloride containing mixtures in such an extreme way, that on reaching a certain quasi eutectic temperature a conventional melting process is no longer observed. The separation of the water of crystallization from the strontium hydroxide octahydrate or lithium hydroxide monohydrate and the absorption by the chlorides is effected to such a degree, that even after passing the melting point a relatively solid mass having a slightly doughy consistency is formed, the volume of which differs only slightly from the volume that of the hydroxide hydrate. Surprisingly, these mixtures have a noticeably lower vapor pressure, causing a reduction in the evaporation of water, which is to be seen, for example, with pure strontium hydroxide octahydrate around 100° C.

Such results do not apply to barium hydroxide octahydrate, at least not with chloride mixtures. Though barium hydroxide octahydrate has a similar molecular arrangement to strontium hydroxide octahydrate, the melting behavior is different. Though it has the hydroxide hydrates melting incongruence and phase separation, it is readily soluble in the separated water of crystallization, for which reason the melting process is regarded as nearly congruent. My own investigations indicated, that mixtures of sodium chloride or potassium chloride with barium hydroxide octahydrate lead to extremely peritectic systems having melting ranges reaching far-beyond the melting temperature of pure barium hydroxide octahydrate, so that such mixtures are unsuitable as phase change or thermal storage materials.

For mixtures of sodium chloride and/or potassium chloride with strontium hydroxide octahydrate or lithium hydroxide monohydrate which strongly exhibit "dry melting", it can be advantageous, e.g. to facilitate the filling of a container (because of better densification), or to obtain better contact with the surfaces transferring heat, to prepare the mixture with a small amount of water (in the range of up to about 5 percent by weight, of the total composition).

The invention will be further explained below by means of examples. For this purpose several quasi-binary and quasi-ternary mixtures of
strontium hydroxide octahydrate
lithium hydroxide monohydrate
sodium nitrate
potassium nitrate
potassium chloride and
sodium chloride
were prepared, their melting and solidification behaviour verified and their caloric values determined, using a differential scanning calorimeter. Data for the pure substances as well as data for selected examples of mixtures—arranged according to increasing melting points—is listed in the attached table. As described before, not all the mixtures behave the same way, but they all display reliable melting and solidification behaviour, which is acceptable, and have, as can be seen from the table, high volumetric specific melting enthalpies, which nearly reach those of the pure hydroxide hydrates. The melting points of the mixtures lie below those of the pure hydroxide hydrates, which is generally desirable.

The examples listed in the table can be classified in several groups, as follows:
1) mixtures of one of both hydroxide hydrates with chlorides;
2) mixtures of one of both hydroxide hydrates with nitrates;
3) mixtures of one of both hydroxide hydrates with chlorides and nitrates;
4) mixtures of both hydroxide hydrates with each other, and
5) mixtures of both hydroxide hydrates with each other with one or more of the salts.

As indicated in the table, only mixtures of the first group show "dry melting". Whilst the mixtures of the other groups melt incongruently, they recrystallize fairly quickly and fairly reproduceably. The mixtures of the first group are preferred in some cases, especially when heat released during cooling should be available immediately, or if large storage units are to be filled, this is because of their unusual melting behaviour. Mixtures belonging to the other groups also have high calorie values and may find use, where it is not necessary to fill up large layer thicknesses within the storage unit, and where the stored heat can be released more gradually, for example in water used industrially.

Figure 2:
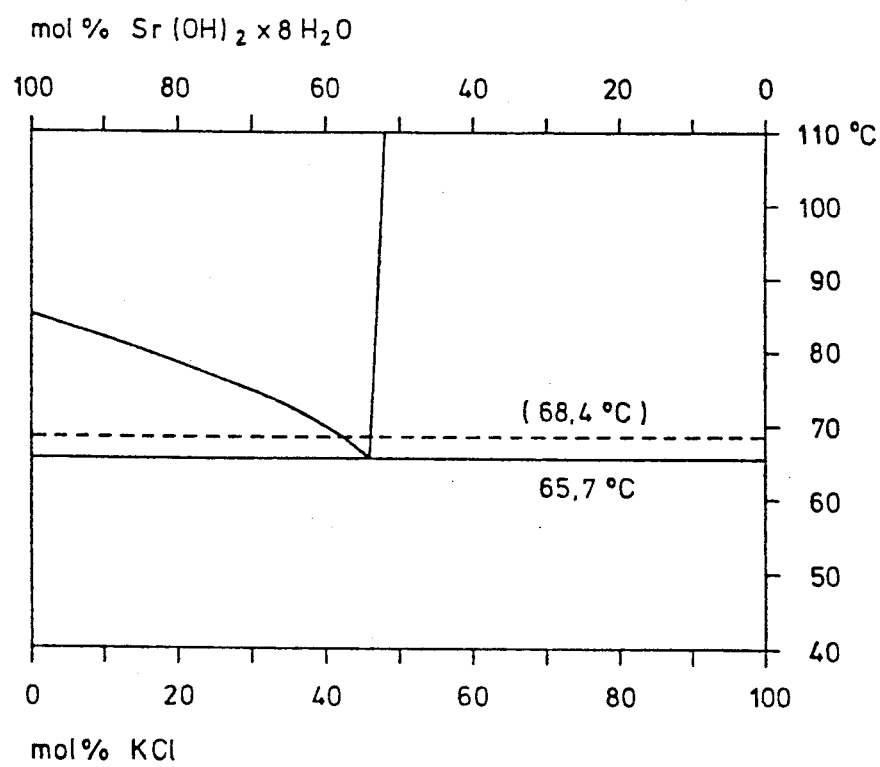
Figure 3:
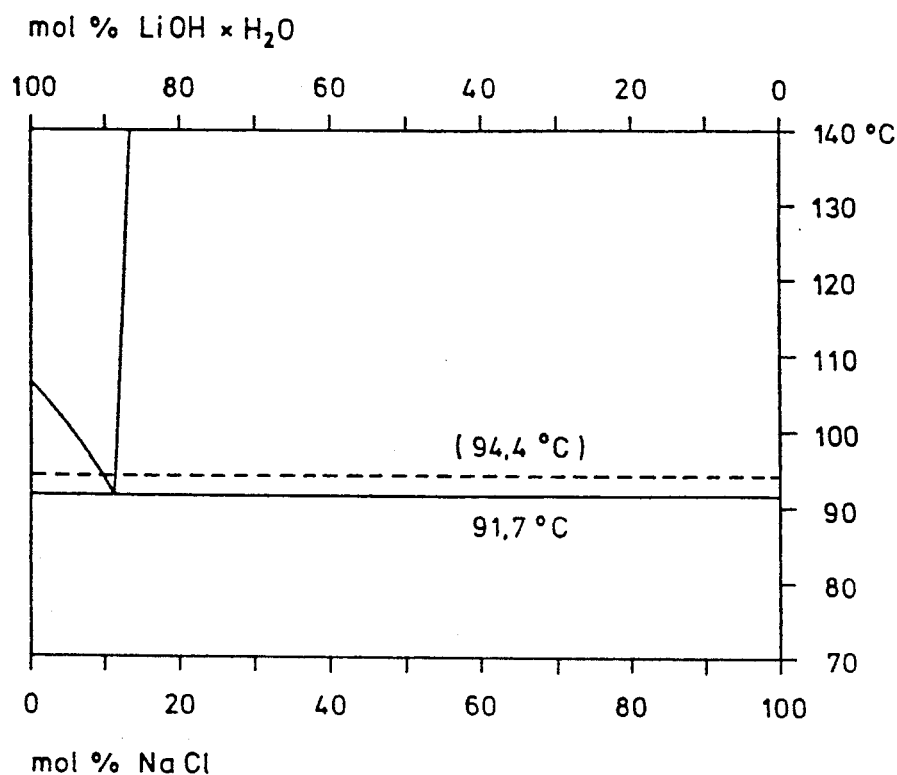
Figure 4:
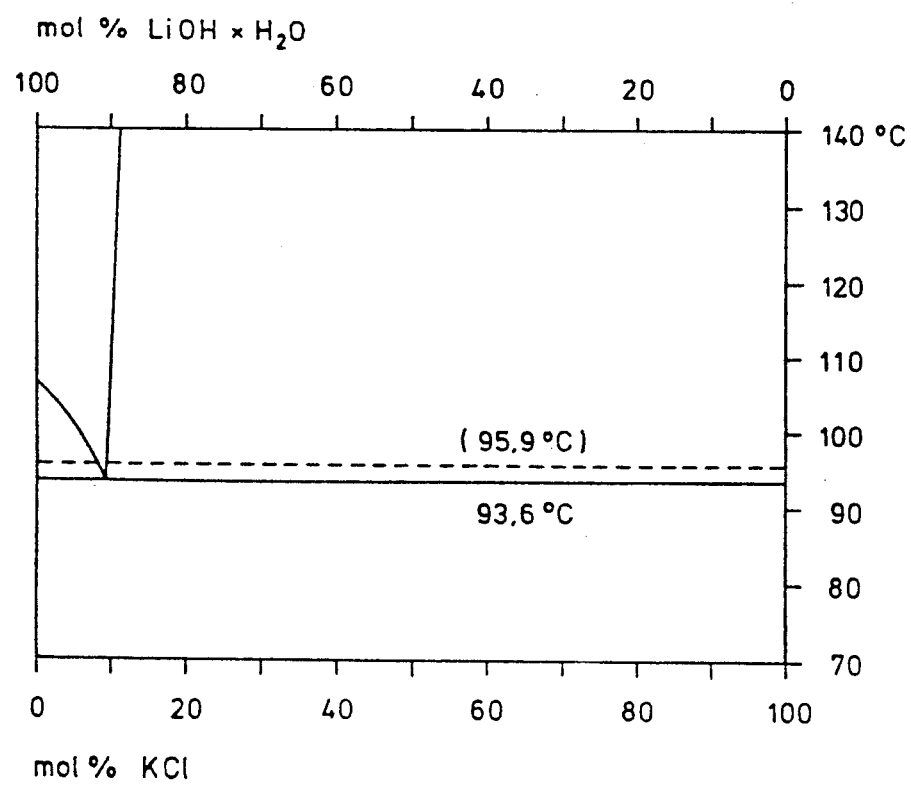

The invention will be further described with reference to the accompanying drawings showing, by way of example, phase diagrams of the quasi-binary systems of the first group, which have been obtained using solidification curves, and in which:

FIG. 1 graphically displays results obtained from a strontium hydroxide octahydrate/sodium chloride mixture;

FIG. 2 graphically displays results obtained from a strontium hydroxide octahydrate/potassium chloride mixture;

FIG. 3 graphically displays results obtained from a lithium hydroxide monohydrate/sodium chloride mixture;

FIG. 4 graphically displays results obtained from a lithium hydroxide monohydrate/potassium chloride mixture;

It is clear, that these systems behave like eutectics (or pseudo-eutectics), the curve is very steep which runs towards the pure chloride. The eutectic mixtures based on strontium hydroxide octahydrate are located at a molar ratio of about 50:50, and for systems based on lithium hydroxide monohydrate, in the range of about 90:10. Because of the different molar weights both systems but result in nearly the same weight ratio for the eutectic mixture. In FIGS. 1 to 4 the respective eutectic solidification temperature (solid line) and eutectic melting temperature (dashed line) are indicated. The systems thus show a small hysteresis. The same applies to the quasi-ternary mixtures of this group.

The mixtures of strontium hydroxide octahydrate or lithium hydroxide monohydrate with sodium chloride and/or potassium chloride are very well suited for heating buildings, e.g. to store heat from solar energy or off-peak electricity.

These mixtures may also be used as latent heat sinks for thermal protection of temperature-sensitive electronic measuring devices, e.g. in continuous furnaces or in borehole probes for geophysical exploration of deep wells, since they possess remarkably lower vapor pressures compared to the pure hydrates and can be exposed to higher temperatures without damaging the container.

Another use of these mixtures is for hot plates (so-called rechauds) for food, common in homes and restaurants. Conventionally such hot plates are heated metal plates (capacitive heat accumulators) or electrically heated devices, and thus don't possess a large thermal storage ability and have no critical temperature during cooling, or are inconvenient because of the necessary electrical cables. Compared with that, the present mixtures can provide hot plates which hold a fairly constant temperature for a longer period of time, without the need of electrical cables after an initial heating.

It is further proposed that these mixtures, especially a slightly over-eutectic mixture of 55–65· mol % of stronium hydroxide octahydrate and 45–35 mol % of potassium chloride which has a melting point around 69° C., for preheaters for cars. This requires charging a latent heat storage unit by means of the engine cooling water while the motor is running and storing this heat for several days with least possible losses, to achieve immediate working of the car heating system during a cold start, or to shorten the cold starting phase of the motor, thus reducing wear and emissions.

Such devices are already being developed, using barium hydroxide octahydrate as phase change material for experimental purposes. Barium hydroxide octahydrate is very poisonous and has a melting point of 78° C., a little above the temperature of 70° C., which is regarded as optimal. More seriously, barium hydroxide octahydrate reacts violently with aluminium and its alloys, generating heat and cracked gases, and quickly destroying structural members made of these light metals. In modern automobiles not only radiators, but also in many cases cylinder heads and engine blocks are made of aluminium, or aluminium alloys. Such devices would get rapidly damaged if the storage unit leaked barium hydroxide octahydrate into the cooling water circuit.

It has now been found that strontium hydroxide octahydrate is only about a twenty sixth as reactive to aluminium as barium hydroxide octahydrate. Furthermore the reactivity is not violent up to about 120° C. This unexpectedly mild behaviour of strontium hydroxide octahydrate toward aluminium is less marked with the present mixtures, e.g. with potassium chloride, but still is remarkably less than a tenth of the reactivity of barium hydroxide octahydrate. In addition the mixtures proposed by the invention, belonging to the first group, melt "dry", so that even in a case of a leak no quantities worth mentioning of phase change material could flow out.

Another feature of mixtures of strontium hydroxide octahydrate or lithium hydroxide monohydrate and the chlorides is the possibility to vary the composition within certain limits starting at the eutectic, where preferably the portion of said hydroxide hydrates is slightly enlargeable beyond the eutectic point, to control the properties of the mixture, e.g. solidification behaviour and recrystallization temperature. The small supercooling of up to 2K found with these mixtures thus can be compensated.

Of the mixtures of the second group, an invariant mixture between strontium hydroxide octahydrate and potassium nitrate in a molar ratio of 1:1 is of note. This mixture has a melting point of 59°, 7° C. and a melting enthalpy of 315 J/g. This mixture melts incongruently, but recombines the separated water of crystallization completely (if the layer thicknesses are not too large) automatically in a very short time. This mixture may be useful for industrial water, and even for hot plates and similar applications, where the relatively low melting temperature is an advantage.

The mixtures of the second group, just as mixtures of the third group (which surprisingly react like mixtures of the second group, and not like those of the first group) preferably are used in an eutectic range. The examples of the second group given in the table are quasi-eutectic.

The mixtures of the fourth group, thus those of the both hydroxide hydrates without addition of the salts, form an eutectic at a molar ratio in the order of 50:50, and preferably are used having a mixture ratio near the eutectic. The same is true too for mixtures of the fifth group, i.e. even if a chloride or nitrate is added to the mixture of both hydroxide hydrates, the molar ratio between the two hydroxide hydrates should remain between about 40 and about 60 mol %. The mixtures of the fourth and fifth group are similar in their melting behaviour to those of the second and third group. Thus an admixture of chlorides does not cause "dry" melting behaviour in mixtures of the fifth group—contrary to a theoretical expectation derived from the behaviour of the first group—but exhibits incongruent melting and good recrystallization. The phenomenon of "dry" melting thus surprisingly is limited to the mixtures of the first group.

To sum up, it can be said, that with the invention a family of phase change materials is made available, which permits the selection of a large number of melting points in the range from about 40° C. to nearly 100° C., having very high volumetric specific melting enthalpies and being cycle-proof. With regard to their toxicity they are at least on the basis of strontium hydroxide octahydrate relatively acceptable. Some of the main mixture components, such as strontium hydroxide octahydrate, just as the proposed mixtures of sodium chloride and potassium chloride, as well as e.g. potassium nitrate, are available in large quantities cheaply. With some of the proposed mixtures the problem of phase separation is removed, with others reduced to insignificance. The solidification texture is advantageously finegrained, the volume change during phase change in most cases is small. The reactivity to aluminium and its alloys is reduced. The vapor pressure of some of the mixtures is noticeably lowered. Super-cooling during recrystallization is small and reproduceable, or adjustable by means of the component ratio. Thus providing improved performance and properties of latent heat storage units.

TABLE

| | | data | | | |
|---|---|---|---|---|---|
| | | melting point (°C.) | density g/cm$^2$) | melting anthalpy | |
| | | | | (J/g) | (J/cm$^2$) |
| substance | | | | | |
| Sr(OH)$_2$ × 8H$_2$O | (S) | 85.0 | 1.91 | 382 | 730 |
| LiOH × H$_2$O | (L) | 106.8 | 1.51 | 465 | 702 |
| NaNO$_2$ | (NN) | 306 | 2.26 | 172 | 389 |
| KNO$_2$ | (KN) | 337 | 2.11 | 95 | 200 |
| KCl | (KC) | 772 | 1.98 | 342 | 677 |
| NaCl | (NC) | 800 | 2.16 | 493 | 1065 |
| mixtures (mol/mol) | | | | | |
| S/NN | 10/20 | 42–48 (i) | 2.14 | 235 | 503 |
| S/KN/KC | 20/10/10 | 52–54 (i) | 1.98 | 301 | 596 |
| S/L/NC | 45/45/50 | 56.6 (i) | 1.91 | — | — |
| S/KN | 50/50 | 59.7 (i) | 2.01 | 318 | 639 |
| S/NC/KC | 52/25/23 | 60.2 (*) | 1.99 | 316 | 629 |
| S/L/KC | 49/49/46 | 61.0 (i) | 1.88 | — | — |
| S/NC | 50/50 | 63.0 (*) | 2.04 | 318 | 649 |

TABLE-continued

| | | melting point (°C) | | density g/cm² | melting anthalpy | |
|---|---|---|---|---|---|---|
| | | | | | (J/g) | (J/cm²) |
| S/KC | 55/45 | 68.4 | (*) | 1.94 | 323 | 627 |
| S/KC | 60/40 | 68.5 | (*) | 1.94 | 336 | 652 |
| S/L | 50/50 | 73.5 | (i) | 1.71 | 334 | 571 |
| L/NC/KC | 91/5/4 | 93.0 | (*) | 1.56 | 400 | 624 |
| L/NC | 90/10 | 94.4 | (*) | 1.58 | 402 | 635 |
| L/KC | 92/8 | 95.9 | (*) | 1.55 | 411 | 637 |

(i) = incongruent melting
(*) = "dry" melting

The embodiments of the invention in which an exclusive property or privilege is claimed are defined as follows:

1. A heat transfer composition comprising at least two members selected from the group consisting of:
   a) strontium hydroxide octahydrate;
   b) lithium hydroxide monohydrate; and
   c) non-hydrate forming chlorides or nitrates,
wherein for a mixture comprising a) and b) the composition contains from about 40 to about 60 mol % of one hydroxide hydrate relative to the other hydroxide hydrate and for a composition containing c) and a) or b), the composition contains from about 5 to about 40% by weight of total c) based on the total weight of hydroxide hydrate.

2. A composition according to claim 1 comprising from about 5 to about 25% of sodium or potassium chloride.

3. A composition according to claim 1 comprising component c) wherein from about 40 to about 60 mol % of the total chloride content is a mixture of sodium and potassium chloride.

4. A composition according to claim 1 comprising up to 5% of water.

5. A composition according to claim 1 comprising from about 20 to about 40%, based on the total weight of hydroxide hydrate, of sodium or potassium nitrate.

6. A composition according to claim 1 comprising from about 55 to about 65 mol % of strontium hydroxide octahydrate and from about 40 to about 35 mol % of potassium chloride.

7. A preheater for an automobile engine cooling system comprising a composition according to claim 1 which has a melting temperature in the range between about 60° to about 80° C.

8. The method for transferring heat to a material comprising bringing said material in contact with a surface heated by the composition of claim 1.

9. The method of claim 8 wherein said material is food.

10. The method for protecting a heat-sensitive device comprising maintaining said device in heat-transfer contact with the composition of claim 1.

11. Phase change material based on strontium hydroxide octahydrate or lithium hydroxide monohydrate, where to one of these two hydroxide hydrates at least one salt selected from the group consisting of non-hydrate forming chlorides, non-hydrate forming nitrates and the other hydroxide hydrate is admixed, the added quantities of the other hydroxide hydrate laying in the range of 40-60 mol % related to the quantity of the first hydroxide hydrate, and where the added quantities of salt make out a part of 5 to 40 percent of weight, related to the total quantity of hydroxide hydrate.

* * * * *

UNITED STATES PATENT AND TRADEMARK OFFICE
CERTIFICATE OF CORRECTION

PATENT NO. : 5,085,790
DATED       : February 4, 1992
INVENTOR(S) : GERD HORMANSDORFER It is certified that error appears in the above-identified patent and that said Letters Patent is hereby corrected as shown below:

Title page, fourth line of ABSTRACT, "octahydrato" should be --octahydrate--.

Column 1, line 6, "chase" should be --phase--.

Column 2, line 18, "85°,5°" should be --85,5°--.

Column 2, line 32, "106°,8°" should be --106,8°--.

Column 7, line 46, "59°,7°" should be --59,7°--.

Signed and Sealed this

Twenty-fifth Day of May, 1993

Attest:

MICHAEL K. KIRK

Attesting Officer  Acting Commissioner of Patents and Trademarks